United States Patent
Reiners et al.

(10) Patent No.: US 7,604,691 B2
(45) Date of Patent: Oct. 20, 2009

(54) ADSORPTION FILTER FOR FUEL VAPORS

(75) Inventors: Frank Reiners, Waiblingen (DE);
Hagen Zelssmann, Herrenberg (DE)

(73) Assignee: Mable Filtersysteme GmbH, Stuttgart (DE)

( * ) Notice: Subject to any disclaimer, the term of this patent is extended or adjusted under 35 U.S.C. 154(b) by 542 days.

(21) Appl. No.: 10/560,881

(22) PCT Filed: Jun. 17, 2004

(86) PCT No.: PCT/DE2004/001259

§ 371 (c)(1),
(2), (4) Date: Dec. 13, 2005

(87) PCT Pub. No.: WO2005/005022

PCT Pub. Date: Jan. 20, 2005

(65) Prior Publication Data

US 2006/0144228 A1    Jul. 6, 2006

(30) Foreign Application Priority Data

Jun. 28, 2003   (DE) .............................. 103 29 200

(51) Int. Cl.
  *B01D 53/02* (2006.01)
(52) U.S. Cl. .............................. 96/133; 95/143; 95/146; 96/153; 123/519
(58) Field of Classification Search .................. 95/144, 95/146; 96/108–154; 123/518–520
See application file for complete search history.

(56) References Cited

U.S. PATENT DOCUMENTS

| 4,971,605 | A |   | 11/1990 | Tarman |
| 5,861,050 | A | * | 1/1999 | Pittel et al. ..................... 95/115 |
| 2001/0020418 | A1 | * | 9/2001 | Yamafuji et al. .............. 96/130 |
| 2002/0174857 | A1 | * | 11/2002 | Reddy et al. ................. 123/520 |
| 2005/0223900 | A1 | * | 10/2005 | Yoshida et al. ................ 96/108 |
| 2005/0247202 | A1 | * | 11/2005 | Seki ............................ 96/146 |

FOREIGN PATENT DOCUMENTS

| EP | 1 113 163 A2 | 7/2001 |
| FR | 2 847 586 A | 5/2004 |
| JP | 63-246462 A | 10/1988 |
| JP | 10-339218 A | 12/1998 |
| WO | WO 99/64223 | 12/1999 |
| WO | WO 01/93985 A | 12/2001 |

OTHER PUBLICATIONS

International Search Report Sep. 29, 2004.

* cited by examiner

*Primary Examiner*—Duane Smith
*Assistant Examiner*—Christopher P Jones
(74) *Attorney, Agent, or Firm*—Collard & Roe, P.C.

(57) ABSTRACT

The invention relates to an adsorption filter for fuel vapors, particularly from the fuel tank of a combustion engine of a motor vehicle, which can be regenerated by desorptive reverse flow back flushing and which interacts with heat accumulating substances via the adsorbable or desorbable filter material. The aim of the invention is to increase the heat accumulability inside the filter material. To this end, the heat accumulating substances consist of phase-change materials (PCM) that are distributed in small units within the reactive filter material.

5 Claims, 1 Drawing Sheet

ADSORPTION FILTER FOR FUEL VAPORS

CROSS REFERENCE TO RELATED APPLICATIONS

Figure 1:
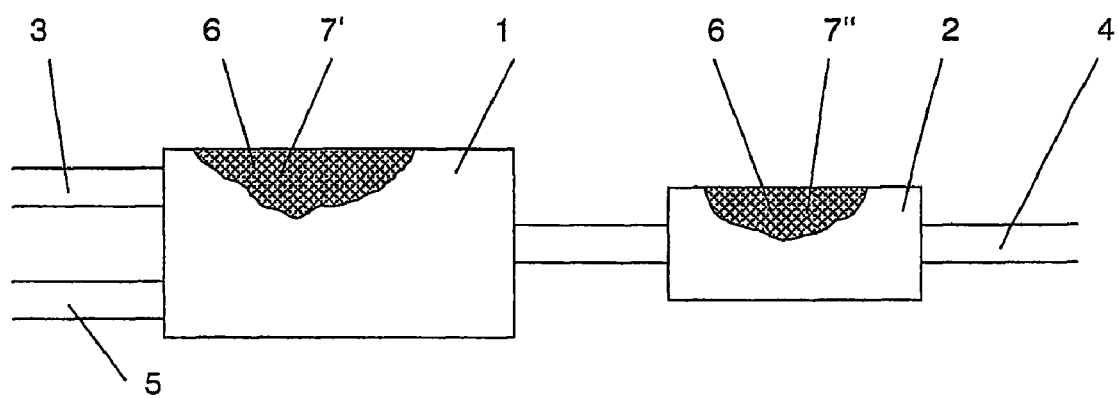

Applicants claim priority under 35 U.S.C. §119 of German Application No. 103 29 200.4 filed Jun. 28, 2003. Applicants also claim priority under 35 U.S.C. §365 of PCT/DE2004/001259 filed Jun. 17, 2004. The international application under PCT article 21(2) was not published in English.

This invention relates to an adsorption filter.

Such a filter is known from U.S. Pat No. 5,861,050A. Similar filter designs are disclosed in United States Patents US2002/0174857, US2001/0020418A1, EP 1 113 163 A2 and Japanese Patents JP63-246462 A and JP10-339218A.

This invention relates to the problem of increasing the heat-storing effect of the heat-storing substances. In addition, the desorbing properties of the filter material should be improved by regeneration of the filter in the area of the backwashing gas inlet.

This problem is solved primarily by a generic adsorption filter having a design according to the present invention.

Advantageous and expedient embodiments are the objects of the dependent claims.

This invention is based on the general idea of greatly increasing the heat-storage capacity of the heat-storing substances by using essentially known phase change materials in an adsorption filter for fuel vapors from the tank container in particular of an internal combustion engine in particular of a motor vehicle.

One example of a known phase change material is wax. Wax melts when heat is applied. In doing so, the wax utilizes the heat supplied to it to break the bonds of its molecules instead of raising its temperature. Instead of storing heat, liquefied wax stores energy of bonding, which is then released again as heat on solidification, i.e., with a phase change from liquid to solid. It is known from WO 99/64223 that granular phase change material may be distributed throughout a foam to compensate for and/or suppress temperature fluctuations in such foams caused by external influences.

To be able to absorb the heat that is to be stored rapidly and well, phase change materials that are used generically are preferably used in the form of small beads with a diameter in the range of approximately 10 μm. In the case of wax as the phase change material, it is encapsulated in a sheathing with a thickness of only approximately 200 nm.

The amount of phase change material may be varied quantitatively in the direction of flow through the adsorption filter to obtain different operating properties over the length of the adsorption filter.

Phase change materials may have melting points, i.e., phase change temperatures, of different values between approximately 5° C. and 70° C., depending on the type of material selected.

In a particularly advantageous embodiment of the present invention, phase change materials having different phase change temperature limits are used in the direction of flow of the adsorption filter.

It has proven to be especially advantageous to use phase change material having phase change limits that increase with the temperature in the direction of flow of the filter (in adsorption operation). The advantage here is that fuel vapor to be adsorbed in the filter can be adsorbed at the lowest possible temperature which is favorable for a high adsorption effect in the entrance area of the filter for a period of time during which the phase change material has not yet melted completely. In the case of exposure to fuel vapor to be adsorbed taking place during a relatively short period of time such as while filling a tank, for example, the final temperature of the filter material is also kept relatively low in this range due to the heat withdrawal which also takes place due to the melting of the phase change material. Even after the phase change material has melted completely, the adsorption process still continues for a period of time that is not too long, the heat of melting absorbed by the phase change material remains a temperature-lowering influence. with reference to the final temperature.

In the area of the filter on the outlet end during adsorption operation of the filter, there should not be any adsorbable fuel vapor; in other words, this area should serve essentially as a safety zone for the worst extreme situations. Fuel vapors to be adsorbed occur especially in filling the tank, but this process is limited to a relatively short period of time. An adsorption filter in which the fuel vapor is adsorbed during the filling of a fuel tank is regenerated by backwashing with fresh air while the engine is running. The highest possible temperature of the reactive filter material is advantageous for regeneration, i.e., desorption. Phase change material having a relatively high conversion temperature range of 60° C. to 70° C., for example, has the advantage described below when arranged in the end area of the filter on the fresh-air end.

If the adsorption filter is exposed to fuel vapors to a relatively great extent in a particularly long tanking procedure with unfavorable adsorption conditions at the same time as far as the fresh-air end area, which should actually remain free of fuel vapors as a safety zone, then the filter material there may assume temperatures up to approximately 75° C., for example. In the case of phase change material with a conversion temperature between 60° C. and 70° C., this material melts under such a filter burden, so that thereafter a corresponding latent heat is stored in the fresh-air end of the filter area. This latent heat has a positive effect in the case of backwashing of the adsorption filter, which takes place immediately after the exposure to fuel through engine operation, for example, such that this latent heat can be recovered in backwashing during the desorption process. Thus, a relatively high temperature, which is favorable for desorption, is maintained in the area of the adsorption filter on the fresh-air end.

With respect to the fresh-air end area of the adsorption filter, however, it may also be advantageous here to use a phase change material having a relatively low conversion temperature of approximately 20° C. to 30° C., for example. Such an advantage is obtained, for example, when the fuel vapor diffuses slowly through the filter toward the fresh-air end in the case of slow evaporation of fuel from the tank. Such a case occurs, for example, when a vehicle is being tanked up and sits still for a long period of time, namely at high ambient temperatures in particular. In the case of such adsorption, no high temperatures are reached in the area of the filter at the fresh-air end. In such an application, if the conversion temperature is below the ambient temperature in such an application case, then in backwashing the adsorption filter through engine operation, for example, the phase change material which is melted at the ambient temperature may release stored heat of melting during desorption, thereby reducing the temperature drop during the desorption process accordingly.

Since both of the cases described above can occur in practice, it may be advantageous to use a mixture of phase change material having a relatively high conversion temperature on the one hand and a phase change material having a relatively low conversion temperature on the other hand simultaneously in the end area of the filter on the fresh-air end.

It is fundamentally possible to use phase change material having a phase change limit which increases practically steadily with an increase in temperature over the flow length of the adsorption filter, and it is of course also possible—and frequently even extremely advantageous—to cover large adjacent areas with phase change material of a certain phase change temperature, i.e., to increase the phase change temperature incrementally in successive areas. It may be sufficient, for example, to merely provide two separate areas with different phase change temperatures of the phase change material.

To permit the most rapid possible storage of heat, the phase change material is in the form of extremely small granules, namely in the form of beads having diameters of only approximately 10 μm, for example. In the case when the beads are introduced loosely into a granular activated carbon bed, for example, there is the risk of separation of the small beads over the course of the operating time. To prevent this, the granular end or spherical phase change material which is present in the form of small capsules is mechanically combined into larger units. This may be accomplished, for example, by means of a porous sheathing in particular, where the sheathing may involve sections cut from tubing or individual cushion coverings. The capsules may also be connected to one another and/or to the reactive filter material with the use of adhesives, or applied by adhesion to a film-like lining material, which may be porous in particular.

The larger units into which the fine-grained capsule-like phase change material is formed by combining the material can also be referred to as pellets. The size of these pellets corresponds approximately to the size of the grains of granular adsorption material. Size deviations may occur in the range of approximately ±10% to 20%. The usual grain diameters of granular adsorption material in adsorption filters for fuel vapors are between approximately 1 and 3 mm. In the case of a rod design of the adsorption material, lengths of up to 5 to 10 mm may occur with the same diameters.

To obtain an especially good heat transfer and/or heat exchange with pellets consisting of extremely small individual pellets of phase change material, fillers that conduct heat well may be introduced into the pellets. The fillers may correspond approximately in shape and size to the capsules of phase change material. The filler material practically has the function of a "thermal conductivity accelerator" and may be graphite powder or activated carbon powder, for example, whereby the activated carbon is used here independently of its adsorptive effect. Materials made of metals having a good thermal conductivity may also be used as fillers.

Small pellets would be especially advantageous per se for inventive use for heat transfer reasons because the phase change material in this form could best absorb the desired changes in state. However, disadvantages of very small pellets include the fact that such pellets lead to a greater pressure drop within the adsorption material on the one hand while on the other hand separating easily within the adsorption material. Pellets containing filler material having a good thermal conductivity can be manufactured by using a binder material of phase change material capsules and filler material. The binder material may be present in an amount of approximately 5-10% and may likewise serve as a material having a very good thermal conductivity.

An especially advantageous exemplary embodiment to be explained in greater detail below is illustrated in the drawing, in which the only figure shows:

FIG. 1 an adsorption filter in a schematic diagram of a longitudinal section.

An adsorption filter consists of two interconnected chambers 1 and 2. Although the chamber 1 is on the fuel vapor end, the chamber 2 borders the fresh-air end with respect to the direction of flow through the adsorption filter.

On the fuel vapor end, a line 3 leading away from the fuel tank leads into the first chamber 1. On the fresh-air end, a connection 4 connects the second chamber 2 to the atmosphere. On the fuel vapor end, a line 5 leads from the chamber 1 to the combustion air of the engine for which the adsorption filter is provided.

During adsorption operation, fuel vapor flowing into the chamber 1 flows through the line 3 and leaves the chamber 2 through the connection 4.

In desorption operation, i.e., in regeneration of the filter, fresh air passes through the connection 4 into the chamber 2 and leaves the chamber 1 through the line 5 to then be admixed with the combustion air of the engine.

The reactive filter material is activated carbon, which is in the form of granules 6. Wax in the form of tiny sheathed beads combined to form larger pellets is added as a phase change material 7', 7" to the granules 6 of the activated carbons. These pellets may contain in particular additional filler material having a good conductivity with a volume amount of approximately 5% to 15% based upon the total volume. For the cohesion of the individual components within the pellets, a binder may be provided in an amount of approximately 5% to 10%, for example.

The phase change material 7' used in the chamber 1 has a phase change temperature of approximately 30° C., while the material 7" which is in the chamber 2 has a phase change temperature of approximately 60° C. to 70° C. The volume amount of the phase change material is approximately 20% with respect to activated carbon in both chambers. The activated carbon is in granular form with particle diameters of approximately 1 mm to 3 mm, with a spherical shape of the particles. If the particles are rod shaped with a diameter between approximately 1 mm and 3 mm, they may be 5 mm to 10 mm long.

The invention claimed is:

1. An adsorption filter for fuel vapors from the tank container in particular of an internal combustion engine in particular of a motor vehicle, said filter being regenerable by desorptive countercurrent backflushing and in which the adsorptive and/or desorptive filter material has heatstoring substances comprised of phase change material (PCM material =phase change material),
    wherein
        different phase change materials (7', 7') with individual phase change temperatures (conversion temperatures) are provided, which are arranged one after the other in the direction of flow through the adsorption filter,
        the phase change materials (7', 7") are distributed in small units within the reactive filter material,
        the filter material is activated carbon, which is in the form of granules (6), whereby wax in the form of tiny sheathed beads combined to form larger pellets is added as a phase change material (7', 7") to the granules (6) of the activated carbon, whereby these pellets contains additional filler material having a good conductivity; and
    wherein
        the adsorption filter comprises two interconnected chambers (1, 2), whereby the chamber (1) is on the fuel vapor end, while the chamber (2) borders the fresh air end, so that the chamber (1) is upstream of the chamber (2) with respect to the direction of flow through the adsorption filter, in chamber (1) is arranged phase change material consisting of (7'), while in chamber (2) is arranged phase change material consisting of (7"); and wherein said phase change material (7") has a relatively high phase change (conversion) temperature and said phase change material (7') has a relatively low phase change (conversion) temperature.

2. The adsorption filter according to claim 1, wherein the phase change temperatures of the different phase change materials (7', 7") increase in the direction of flow through the adsorption filter.

3. The adsorption filter according to claim 1, wherein the phase change material (7') used in the chamber (1) has a phase change temperature of approximately 30° C., while the phase change material (7"), which is in the chamber (2) has a phase change temperature of approximately 60° C. to 70° C.

4. The adsorption filter according to claim 1, wherein the filler material has a volume amount of approximately 5% to 15%, based upon the total volume.

5. The adsorption filter according to claim 1, wherein the volume amount of the phase change material (7', 7") is approximately 20% with respect to activated carbon in both chambers (1, 2).

* * * * *

UNITED STATES PATENT AND TRADEMARK OFFICE
CERTIFICATE OF CORRECTION

PATENT NO. : 7,604,691 B2
APPLICATION NO. : 10/560881
DATED : October 20, 2009
INVENTOR(S) : F. Reiners et al.

It is certified that error appears in the above-identified patent and that said Letters Patent is hereby corrected as shown below:

Title page, Item [73], please change "Mable" to correctly read --Mahle--.

Signed and Sealed this

Twenty-ninth Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,604,691 B2  Page 1 of 1
APPLICATION NO. : 10/560881
DATED : October 20, 2009
INVENTOR(S) : Reiners et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 853 days.

Signed and Sealed this

Fifth Day of October, 2010

David J. Kappos
*Director of the United States Patent and Trademark Office*